United States Patent
Aronson et al.

(10) Patent No.: US 7,147,387 B2
(45) Date of Patent: Dec. 12, 2006

(54) TRANSMITTER PREEMPHASIS IN FIBER OPTIC LINKS

(75) Inventors: Lewis B. Aronson, Los Altos, CA (US); James D. McVey, Palo Alto, CA (US); The'Linh Nguyen, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 29 days.

(21) Appl. No.: 11/038,757

(22) Filed: Jan. 19, 2005

(65) Prior Publication Data
US 2006/0159462 A1 Jul. 20, 2006

(51) Int. Cl.
*G02B 6/36* (2006.01)
*H04B 10/00* (2006.01)

(52) U.S. Cl. .......................... 385/92; 385/88; 385/14; 398/138; 398/81

(58) Field of Classification Search ................. 385/14, 385/88, 89, 92; 398/81, 134, 135, 138, 139
See application file for complete search history.

(56) References Cited

U.S. PATENT DOCUMENTS

| | | | | |
|---|---|---|---|---|
| 2003/0067655 A1* | 4/2003 | Pedersen et al. | ............ | 359/152 |
| 2004/0258145 A1* | 12/2004 | Popescu et al. | ............. | 375/232 |
| 2005/0285236 A1* | 12/2005 | Sasser et al. | ............... | 257/666 |
| 2006/0067699 A1* | 3/2006 | Chandrasekhar et al. | ... | 398/147 |
| 2006/0159462 A1* | 7/2006 | Aronson et al. | ............ | 398/138 |

OTHER PUBLICATIONS

*Part 3: Carrier Sense Multiple Access with Collision Detection (CSMA/CD) Access Method and Physical Layer Specifications*, Draft IEEE 802.3aq™ /D1.0, Dec. 2004, pp. 1-19.

* cited by examiner

*Primary Examiner*—Brian M. Healy
(74) *Attorney, Agent, or Firm*—Workman Nydegger

(57) ABSTRACT

This disclosure is generally concerned with optical transceivers. In one example, an optical transceiver implements electronic dispersion compensation in the receive path, as well as optical preemphasis on the transmitted signal in order to improve aspects of optical performance on multimode fiber links, relative to systems that do not implement transmitter preemphasis. Among other things, such optical transceivers can be used to achieve longer link lengths over a given fiber and/or to improve the percentage of fibers that can be used with a given performance electronic dispersion implementation.

20 Claims, 7 Drawing Sheets

TRANSMITTER PREEMPHASIS IN FIBER OPTIC LINKS

BACKGROUND OF THE INVENTION

1. The Field of the Invention

The present invention relates generally to the field of optical transceivers and their use. More particularly, exemplary embodiments of the invention are concerned with optical transceivers that include circuits and components which implement a desired preemphasis in transmitted optical signals.

2. Related Technology

As fiber optic transmission systems are pushed to higher data rates and longer transmission distances, the performance of those systems is often limited by one form or another of optical dispersion, which typically occurs as a result of the different respective velocities of the components of an optical signal. More particularly, such differences in respective velocities of the components, sometimes referred to as the "velocity spread," result in the spreading of the optical pulses over time. Because optical data transmission systems rely for their functionality on the transmission and detection of pulses that correspond either to a digital "1" (high power) or digital "0" (low power), spreading of these pulses is a matter of concern.

In particular, the velocity spread means that the pulses that make up the 0s and 1s tend to spread into, or overlap, one another, leading to a condition sometimes referred to as inter-symbol interference ("ISI"). ISI is undesirable because as the extent to which the optical components spread into each other increases, it becomes increasingly difficult, if not impossible, to reliably identify any clear distinction in the power level of a 0 or a 1. This phenomenon is sometimes illustrated graphically in the form of a "closed" optical eye pattern. Because most detection systems rely for their effectiveness on the ability to distinguish between a "1" and "0," with a simple thresholding circuit, the closed, or impaired, eye pattern that results from ISI represents a significant impairment to the operability and usefulness of an optical system.

The problem of ISI has been addressed in various non-optical communication links, such as copper-based high speed electronic links, by implementing compensation in either, or both of, the transmitter and receiver of the transmission system. On the receive side of the system, passive equalization circuits or more sophisticated adaptive electronic equalization have been used. The latter arrangement is often referred to as electronic dispersion compensation ("EDC").

As suggested above, compensation for ISI can also be implemented on the transmitter side of the non-optical system. Compensating for ISI by modifying the transmitter signal is sometimes referred to as "transmitter preemphasis" since this type of method most commonly involves boosting, in some manner, the high frequency content of the transmitted electrical data signal in an attempt to overcome the typical. overall high frequency rolloff of the channel response. Less commonly, other transmitter preemphasis techniques are concerned with "deemphasis," which generally involves deemphasizing low frequencies. In any case, the basic principle is the same, namely, attempting to compensate for the channel frequency response by generating a transmit signal close to the inverse of that frequency response. As discussed elsewhere herein however, the effectiveness of such techniques in copper-based, and other non-optical, links is largely due to the fact that the frequency response of copper and similar media is highly predictable.

The use of electronic equalizers to implement ISI compensation through the use of an EDC mechanism is well known in radio transmission, copper-based high speed electronic links, and disk drive read circuits. More recently, EDC has been used to a much more limited extent in selected optical systems to extend the distances over which high speed links based on electro-absorption modulated lasers ("EML") can operate. Although such systems are often susceptible to wavelength chirp, or shifting of the center wavelength of the EML, EDC techniques can, in some cases, improve the performance and effective transmission distances of such systems.

As another example, EDC techniques have been demonstrated, in some cases, to contribute to improvements in the performance and effective transmission distances of data transmission networks that employ legacy multimode fiber. For the most common grade of presently installed multimode fiber, conventional transceivers can generally not achieve transmission distances beyond 100 m, whereas the most interesting use of these links require transmission distances of at least 220 m with a strong preference for 300 m. In the case of multimode fiber, link distances are limited by modal dispersion, that is, the differences in the effective velocity of the different fiber modes caused by imperfections in the index profiles of the fibers. Depending on the degree of these imperfections, EDC techniques can often be used to achieve the desired distance of 300 m. However, it appears that an important fraction of these fibers may have imperfections that are so great that they cannot be equalized with practical EDC techniques.

This is a matter of significant concern since although many enterprises demand increasingly high levels of performance, such as 10 Gb/s or higher data rates over links of up to 300 m, those same enterprises are often unwilling and/or unable to invest in replacement of an existing legacy system with a new fiber network infrastructure that can support such data rates.

BRIEF SUMMARY OF SOME EXEMPLARY EMBODIMENTS OF THE INVENTION

In one exemplary embodiment of the invention, an optical link or transceiver is provided that is configured to generate and transmit an optical signal that includes an optical preemphasis. Another exemplary embodiment of the invention is directed to a similar optical link or transceiver that further incorporates EDC functionality in the receive path. Among other things, such exemplary embodiments facilitate a relative extension of the distance over which data can be transmitted on legacy multimode fiber, for example, without requiring amplification or other processing. Further, data transmission over these relatively longer link lengths is achieved notwithstanding the modal dispersion that typically attends the presence of significant defects in such legacy fibers. As a result, embodiments of the invention also enable use of a relatively greater fraction of legacy fibers. The foregoing, and other, aspects of exemplary embodiments of the invention will become more fully apparent from the following description and appended claims.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS OF THE INVENTION

Among other things, exemplary embodiments of this invention are concerned with the implementation and use of optical transmitter preemphasis either alone or in conjunction with EDC receivers, for example, to reduce the net EDC penalty and, in turn, to provide for a relative increase in the fraction of legacy fibers which may be usefully employed with a given assumption of the EDC penalty. As discussed in further detail below, exemplary embodiments of the invention take the form of systems, methods and devices that may be employed to the foregoing, and other, ends. While embodiments of the invention are particularly well-suited for use in connection with legacy multimode optical fibers, the scope of the invention is not limited to such applications. Rather, the invention extends to any applications or environments where aspects of the functionality disclosed herein may be usefully employed.

I. Operating Environment

Directing attention first to FIGS. 1A through 4, details are provided concerning various considerations that inform the configuration and/or operation of exemplary embodiments of the invention.

A. Exemplary Infrastructures

It was noted earlier herein that transmitter preemphasis techniques have achieved some measure of success in connection with non-optical transmission media such as copper wire, and such techniques typically obviate the need to use receive side equalization with such non-optical media. Such performance, however, is primarily attributable to the fact that the frequency response of copper and similar media is highly predictable. In contrast, the frequency response of optical media, such as multimode legacy fiber for example, is very unpredictable and thus renders conventional transmitter preemphasis techniques largely ineffective for use in such optical media, as discussed below.

Figure 1A:
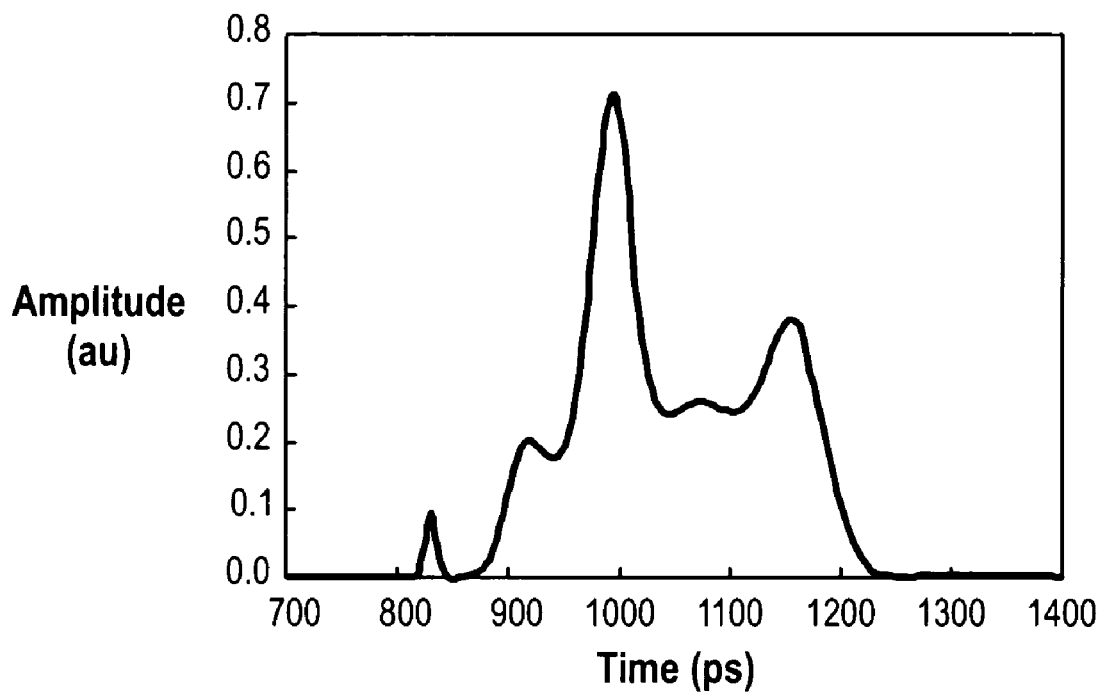
FIG. 1A is a graph illustrating an exemplary multimode fiber pulse response.

In the case of multimode fibers, light may be launched with different coupling into the many mode groups that in turn propagate with velocities characteristic of the imperfections in the fiber index profile. As indicated in FIG. 1A, the resulting impulse response, or the time domain response, can be quite complex. Additionally, FIG. 1B indicates that the frequency response of the fiber can be equally complex. Since this complex response is not predictable or measurable from the transmit side of the link, it is not possible to generate an accurate inverse response. Thus, the use of transmitter preemphasis in multimode fibers is generally much less effective, if at all, when employed with typical receiver systems.

Figure 1B:
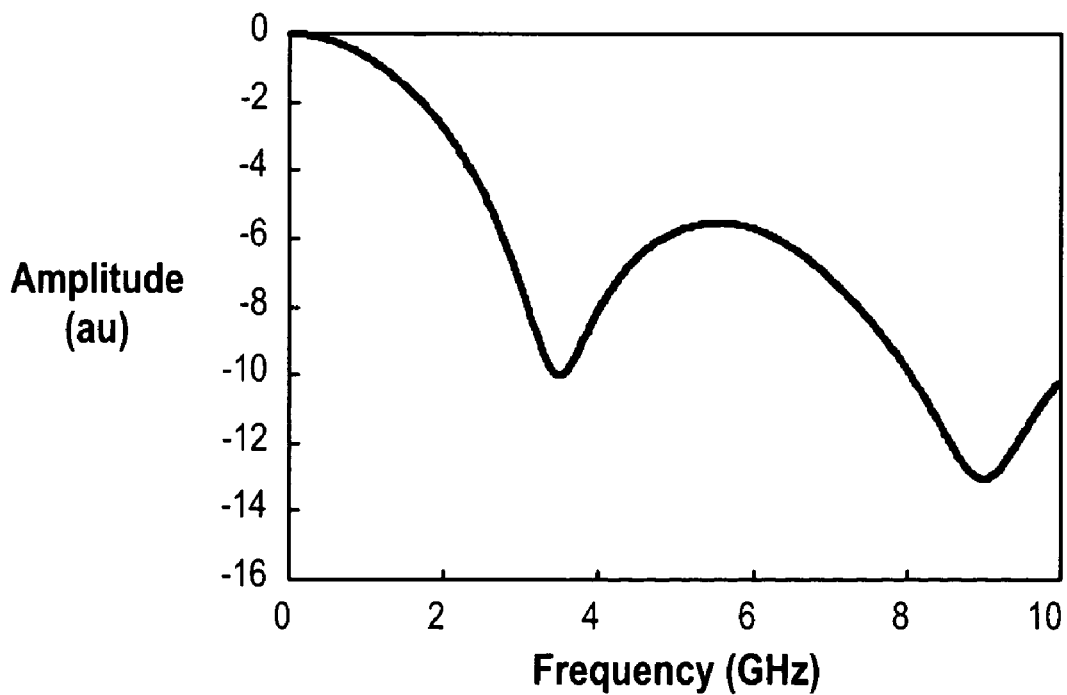
FIG. 1B is a graph illustrating the frequency response of the multimode fiber with which the pulse response illustrated in FIG. 1A corresponds.

With more particular reference to FIG. 1B, the complex frequency response of a typical legacy multimode fiber generally has a decreasing envelope. Exemplary embodiments of the invention at least partially compensate for this characteristic through preemphasis of higher frequencies. Thus, while the resulting eye diagram at the receiver may still be closed after such preemphasis, the signal, when processed by an EDC circuit, typically indicates considerably less penalty. This can be illustrated with reference to one relatively course metric relating to the signal required by the EDC, specifically, the energy under the frequency response curve of the received signal. The energy under this curve can be obtained simply by integration of the curve over a pair of limits.

One standard metric for quantifying the quality of a signal input to an EDC is known as the penalty for ideal equalizer ("PIE"). The PIE can be calculated for different equalizer architectures. For example, the penalty metric for a linear feed forward equalizer is usually designated as PIE-L, whereas the penalty for a DFE equalizer is designated PIE-D. The PIE, which is typically expressed in dBo ("dB optical") corresponds to the excess signal to noise ratio ("SNR") and, thus, the extra power needed to achieve the same bit error rate ("BER") as a hypothetical channel with perfect input response. As discussed below however, a real, or non-hypothetical, EDC will tend to have additional associated penalties, sometimes referred to generally as "implementation penalties."

At a minimum, the power budget of an equalized multimode fiber link needs to be adequate to overcome not only the power losses experienced in the link, but also the equalizer penalty, both ideal and implementation, for the dispersive channel. However, an arbitrarily high ideal equalizer penalty generally cannot be overcome simply by increasing the optical power budget through the use of higher transmitter power or lower noise receivers. Rather, practical considerations in most equalizer implementations tend to limit the maximum PIE values of a signal that the EDC circuit can detect without errors. Stated another way, the implementation penalty of a real, as opposed to hypothetical, EDC circuit will generally increase rapidly as the PIE-D of the channel exceeds some value. By way of example, a consensus of the maximum PIE-D capability of practical 10 Gb/s equalizer designs for reliable operation is in the range of about +5 dBo to about +6.5 dBo.

B. Exemplary Operational Requirements and Performance Standards

As suggested earlier, there is an interest in the field in developing systems, methods and devices that support relatively high data rates, such as 10 Gb/s for example, on a substantial fraction of 300 m, and other, fiber links. To this end, models have been developed to attempt to predict the impulse responses of fibers in the installed base in order to facilitate evaluation of the fraction of installed legacy links that could, in theory at least, be equalized with a set of standard parameters. As discussed in further detail below, such models are based upon certain assumptions concerning matters such as the optical launch into the fiber, and the offsets in connectors in the link. It should be noted here that these models, as well as the various other models disclosed herein, are not concerned with devices or methodologies for achieving particular results or effects in legacy fibers, but rather serve simply to frame certain problems present in the art.

Figure 2:
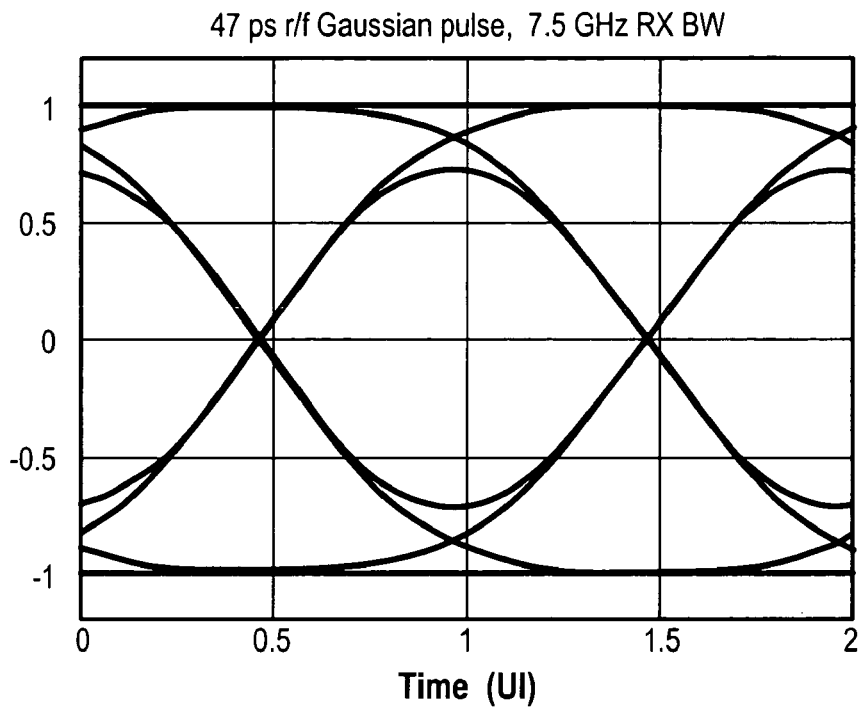
FIG. 2 is an exemplary eye diagram of a standard transmitter waveform as detected by an exemplary receiver.

The models, examples of which include a Monte Carlo model, and a set of 108 specific fiber index profiles sometimes referred to as the "Cambridge model," generate a statistical distribution of impulse responses for a set of links. The PIE-D values of each of these links is calculated using certain assumptions about the transmitted optical waveform and front-end optical receiver that precedes the EDC circuit in the receive path. In particular, the transmitter impulse response is given by 1 UI pulse with a Gaussian pulse response with 47 ps, 20%–80% rise and fall times, where the front end receiver has a $4^{th}$ order Bessel-Thomson response with 7.5 GHz 3 dB point. The eye diagram for this standard transmitted waveform, as detected by the aforementioned front-end optical receiver, is shown in FIG. 2.

In view of the present models and standard input waveform, one estimate of the PIE-D penalty needed to cover 99% of the fiber base is approximately 5.6 dBo. However, this theoretical figure has practical limits. For example, a penalty of this magnitude is generally considered very difficult, if not impossible, for practical equalizers to reliably overcome. Moreover, it could prove problematic to require such a penalty as a minimum standard. A more moderate penalty could alternatively be employed, but would be problematic as well. For example, while a lower penalty such as 4.5 dBo may be more acceptable, the fraction of the fibers covered would only be about 94%, which may well be considered to be inadequate.

To the extent that the aforementioned models rely on a standard transmitted eye waveform to facilitate determinations of power penalties and fiber base coverage, the usefulness of such models is limited. In an attempt to better account for real transmitted signals, and to insure that the limitations in the transmitted waveform do not exceed the equalizer capabilities for the most impaired fibers meant to be supported, a test has been developed that is known as the transmitter waveform dispersion penalty ("TWDP") test. This test (described in "TP-2 Test methodology 0.2.doc" by Swenson et al. and available on the IEEE website at http://grouper.ieee.org/groups/802/3/aq/index.html) involves the use of a computer model whose input is the captured optical transmit waveform.

The model uses one or more fiber models, assumptions about the receiver noise, and a model of a decision feedback equalizer with a large number of taps (to approximate an ideal infinite equalizer) to calculate the excess power needed to achieve the same BER as the BER of a link with an ideal transmitter signal and perfect fiber response. This calculated penalty should, in turn, correspond to the PIE-D penalty of the resulting received signal through the link.

Figure 3:
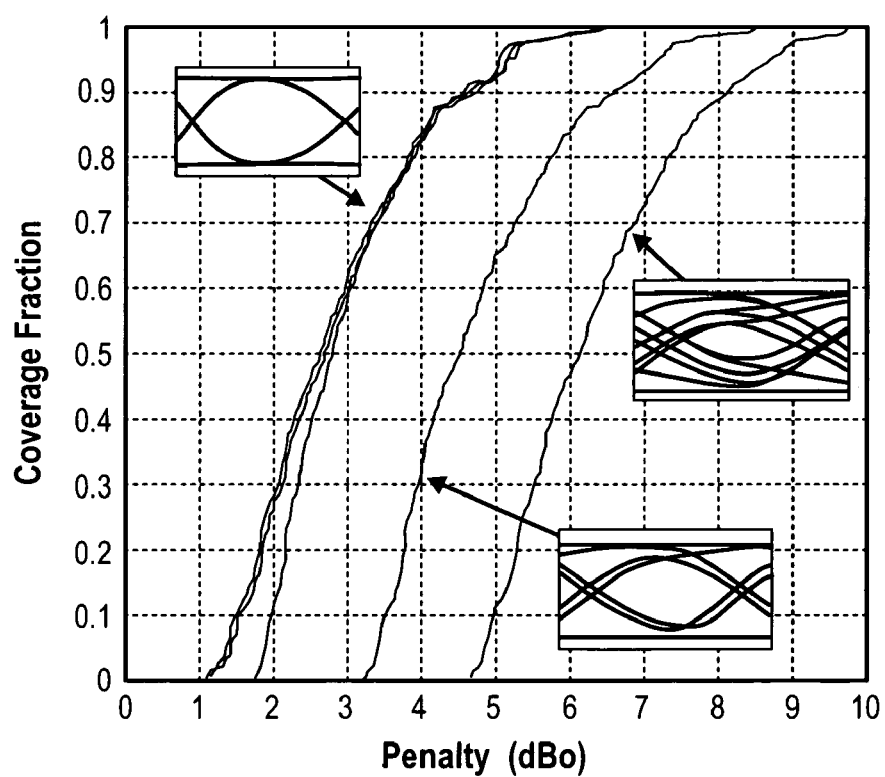
FIG. 3 is a graph indicating the relationship between fiber coverage fraction and frequency response for transmitted waveforms of various quality.

With attention now to FIG. 3, further details are provided concerning the TWDP test. In particular, FIG. 3 shows a curve of the fraction of fibers covered with TWDP values less than that indicated along the x-axis with a near ideal transmitter waveform, and also illustrates several degraded, slower transmitter waveforms in the insets. As is clear from FIG. 3, relatively slower transmitter signals, which have frequency responses which fall off at lower frequencies, result in larger penalties and thus correspond with a relatively smaller fraction of fibers which can be covered with an assumed equalizer performance limit.

Additionally, the TWDP curves for the Cambridge model shown in FIG. 3 indicate that transmitter signals, with frequency responses which increase with frequency up to some limit, actually result in penalties lower than those associated with the standard 47 ps r/f waveform used by the aforementioned models in calculating the PIE-D values for the fibers. Such lower penalties would thus correspond to lower TWDP penalties than are associated with the standard waveform. In this regard, FIG. 4 serves to illustrate some of the benefits of this technique.

Figure 4:
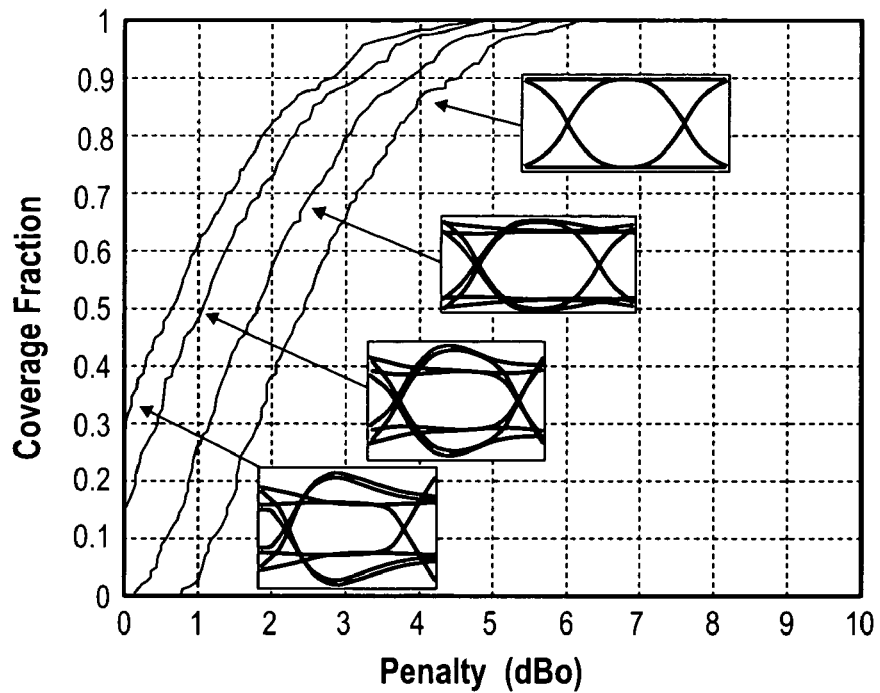
FIG. 4 is a graph illustrating TWDP curves for a range of signals with various degrees of preemphasis, and further illustrating a curve for a transmitted waveform with no associated preemphasis.

More particularly, FIG. 4 illustrates TWDP curves for a range of signals with various degrees of preemphasis, and further illustrates a curve for a transmitted waveform with no preemphasis. As FIG. 4 suggests, the penalties for the waveforms with preemphasis can be as much as 2 dB less than the signal with no preemphasis. This penalty corresponds to fiber coverage of more than 99% for receivers with PIE-D capabilities of 4.5 dBo, as compared to <94% coverage for the transmitter signal with no preemphasis. Details concerning exemplary systems, devices and methods for achieving these, and other, results will now be provided.

II. Exemplary Systems and Devices

As noted earlier herein, exemplary embodiments of the invention are concerned with the implementation and use of optical transmitter preemphasis to facilitate, among other things, a relative increase in the fraction of legacy fibers which may be usefully employed in view of a given assumption of the EDC penalty, and to facilitate relative increases in link length. The following discussion is concerned with exemplary systems and devices configured to achieve results such as are exemplified in FIGS. 3 and 4. Other exemplary embodiments of the invention are configured to achieve additional or alternative results. Accordingly, the scope of the invention should not be construed to be limited to systems and devices of any particular configuration or effective in implementing any particular group of functionalities.

A. Optical Transceivers

Figure 5A:
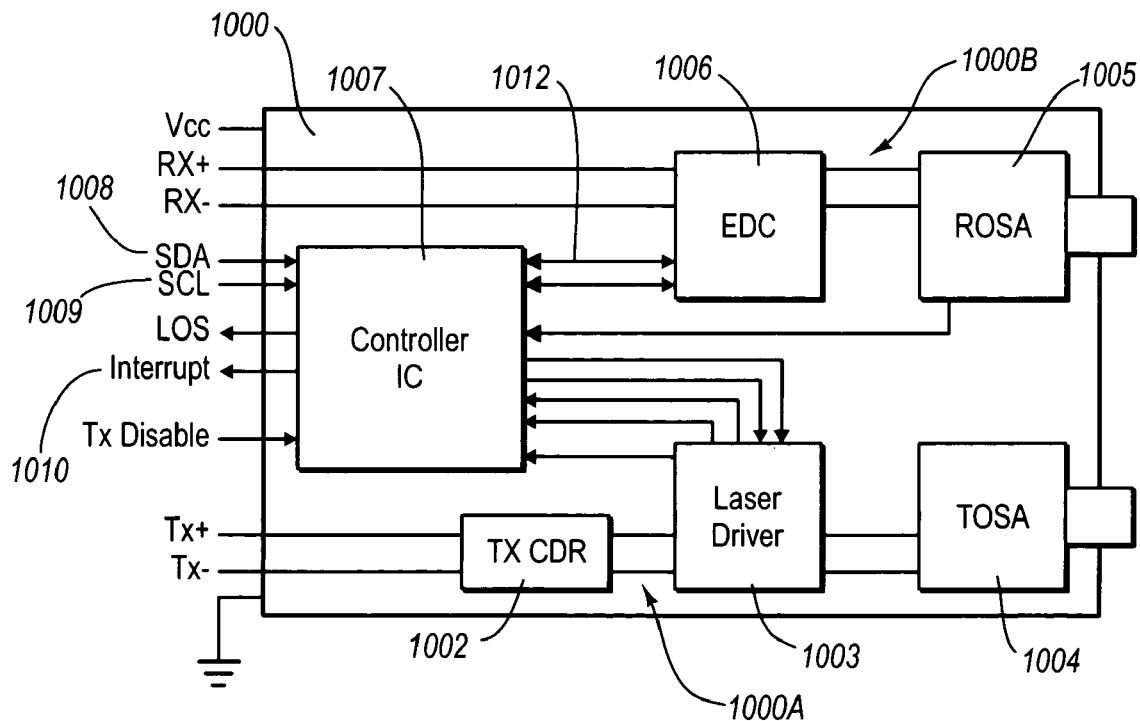
FIG. 5A is a schematic diagram that illustrates aspects of an exemplary optical transceiver that includes a laser driver configured to directly drive the laser as well as to implement a transmitter preemphasis functionality.
Figure 5B:
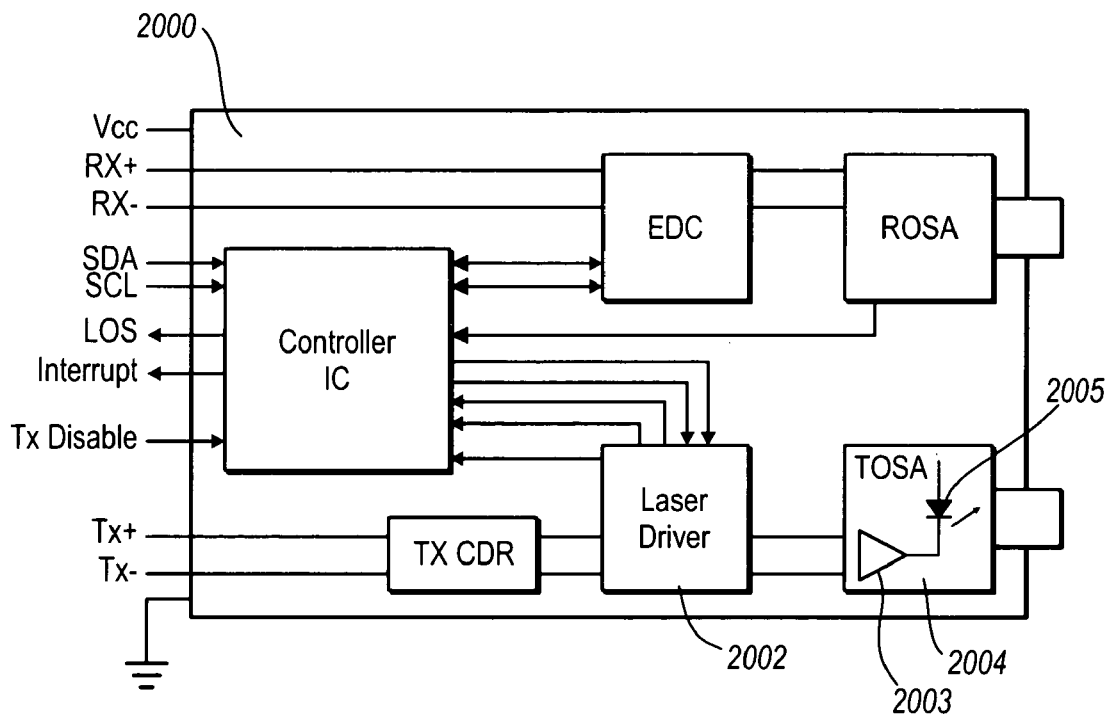
FIG. 5B is a schematic diagram that illustrates aspects of an alternative embodiment of an optical transceiver that includes a laser driver configured to implement a transmitter preemphasis functionality, and further includes a TOSA having a linear amplifier that drives the laser.
Figure 5C:
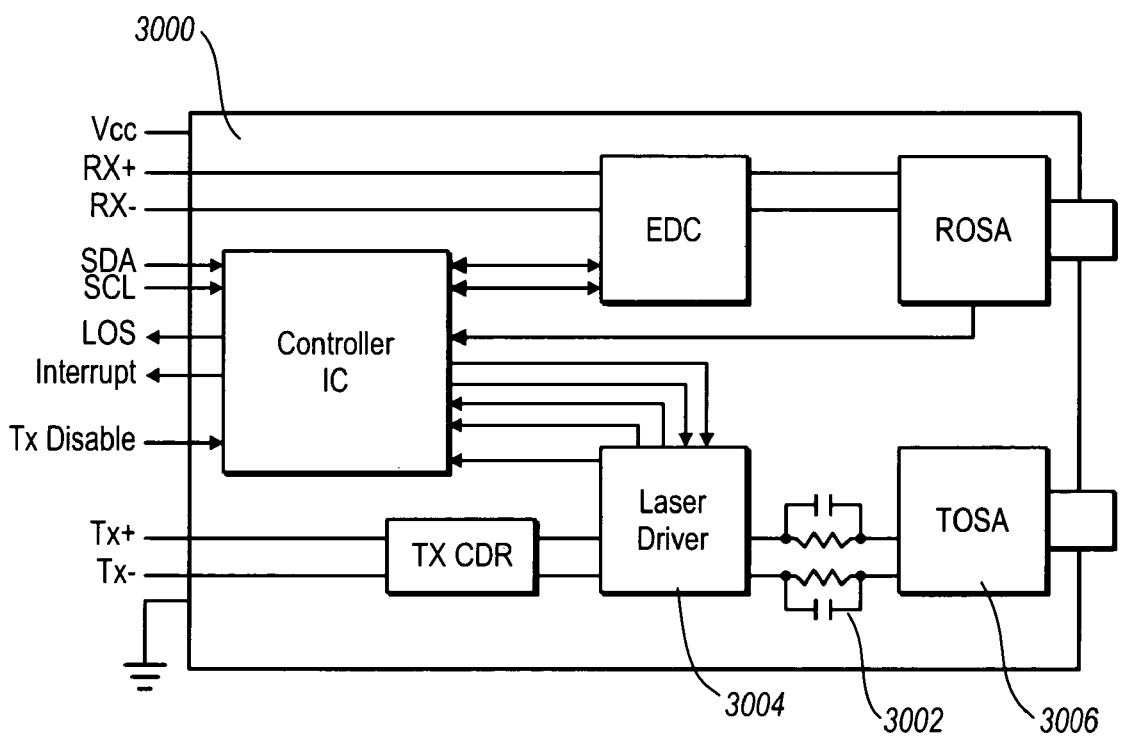
FIG. 5C is a schematic diagram that illustrates aspects of an alternative embodiment of an optical transceiver that includes a laser driver configured to implement a transmitter preemphasis functionality, and further includes a passive circuit between the laser driver that serves to selectively attenuate lower frequencies.

With attention now to FIGS. 5A through 5C, details are provided concerning aspects of various exemplary embodiments of optical transceivers configured to generate preemphasized optical transmitter signals. More particularly, optical preemphasis involves boosting, in some manner, the high frequency content of the transmitted optical data signal in order to overcome the typical overall high frequency rolloff of the channel response.

In the exemplary embodiment disclosed in FIG. 5A, the optical transceiver 1000 conforms to the XFP form factor and is designed to support enhanced transmission over multimode fiber using electronic dispersion compensation. While this exemplary implementation of the optical transceiver 1000 conforms with the XFP form factor, the scope of the invention is not so limited. Rather, embodiments of the invention may be implemented in connection with any of a variety of other form factors, standards, and configurations, examples of which include, but are not limited to, the X2, XENPAK, SFP, and SFF form factors, as well as form factors to be developed in the future.

Similarly, while exemplary embodiments of the invention are well suited for use in connection with data rates at least as high as 10 Gb/s, over optical links as long as 300 m, embodiments of the invention may be employed as well with different data rates and/or link lengths. Further, at least some embodiments of the invention are compatible with standards such as 10-Gigabit Ethernet, while alternative embodiments of the invention are compatible with other standards, one example of which is the SONET standard. Thus, the scope of the invention should not be construed to be limited to use in connection with any particular operating environment or standard.

With more particular attention now to FIG. 5A, the exemplary optical transceiver 1000 includes a transmit path 1000A and a receive path 1000B. The transmit path 1000A of the optical transceiver 1000 includes a transmit clock data recovery, or $T_x$ CDR 1002, a laser driver 1003 and a transmitter optical subassembly ("TOSA") 1004.

Thus arranged, the laser driver 1003 serves to directly drive the laser diode that is included in the TOSA 1004 of the optical transceiver 1000, where the driving of the laser diode may be performed either with or without passive impedance matching elements. While such an arrangement is most common for laser driver circuits, even at data rates to 10 Gb/s, this arrangement does require the laser driver 1003 to provide relatively large output swings. Additionally, the direct connection between the laser driver 1003 and the laser is typically implemented with transmission line impedances of 25 ohms single ended or 50 ohms differential. As disclosed elsewhere herein, alternative arrangements may be employed.

In this exemplary embodiment, the circuitry and components for generating preemphasized optical transmitter signals are included as part of the laser driver 1003. As disclosed elsewhere herein however, such an arrangement is exemplary only and, in some alternative embodiments, the circuitry and components for generating preemphasized optical transmitter signals are implemented as a dedicated component, or as part of another component in the optical transceiver. As well, optical signal preemphasis may be implemented by various combinations of circuits, components and systems. As an example, one embodiment disclosed herein is configured so that one portion of the total optical preemphasis is implemented by the laser driver, while another portion of the total optical preemphasis is provided by passive circuitry.

Consistent with the foregoing, it is noted here that the exemplary circuits, components and systems disclosed herein and configured to individually or collectively generate a drive signal, that causes an optical transmitter to emit a preemphasized optical output waveform, comprise exemplary structural implementations of a means for generating a preemphasized optical output waveform. Although such circuits, components and systems do not directly generate the optical signal, which is ultimately generated instead by the optical transmitter, the aforementioned "means for generating a preemphasized optical output waveform" terminology used herein reflects the fact that those circuits, devices and systems are the genesis for the production and transmission of the preemphasized optical output waveform by the optical transmitter.

More generally however, any other circuits, components and/or systems, or combinations thereof, of comparable functionality may likewise be employed and are accordingly embraced within the scope of the present invention. For example, and as disclosed elsewhere herein, such preemphasis functionality is implemented, in some cases, solely by the laser driver. In yet other cases, the preemphasis functionality is implemented by one or more other circuits and/or devices acting in concert with the laser driver. Such circuitry and/or devices, regardless of implementation or configuration, may be referred to generally herein as "preemphasis circuitry."

With continuing attention to the optical transceiver 1000, the receive path 1000B includes a receiver optical subassembly ("ROSA") 1005 which, in this example, incorporates a linear response transimpedance amplifier ("TIA"), in addition to an optical detector such as a photodiode. The output of the ROSA 1005 is connected to the electronic dispersion compensation integrated circuit ("EDC IC") 1006. The EDC IC 1006 in this example also incorporates the retiming function for the receive path 1000 B, so that no external receive clock data recovery ("CDR") is required. In other embodiments, the retiming function is implemented by circuitry other than the EDC IC. It should also be noted that while the illustrated embodiment includes an EDC IC, the scope of the invention is not so limited. For example, some alternative embodiments of the invention do not include an EDC IC.

In addition to the transmit path 1000A and receive path 1000B components, the exemplary optical transceiver 1000 includes a controller IC 1007 which implements a variety of different functions. Exemplary functions implemented in connection with the controller IC 1007 include, but are not limited to, setup, control and temperature compensation of various elements of the transmit path 1000A and receive path 1000B, as well as implementation of various diagnostic functions. In this illustrated exemplary embodiment, the controller IC 1007 is further connected to a host system or device (not shown) through a pair of pins, SDA 1008 and SCL 1009, which collectively comprise a 2 wire serial interface. An interrupt pin 1010, as defined in the XFP MSA for example, also connects the controller IC 1007 with the host device.

Further, in this exemplary embodiment, the controller IC 1007 is connected by a serial connection 1012 to the EDC IC 1006. Among other things, this arrangement enables the optical transceiver 1000, either alone or in conjunction with a host system or device, to implement various diagnostic and other functionalities relating to the operation of the optical transceiver 1000 and, in some particular cases, to the operation of components in the transmit path 1000A and the receive path 1000B.

With attention now to FIG. 5B, details are provided concerning an alternative embodiment of an optical transceiver, denoted generally at 2000. As the optical transceiver 2000 is similar in many regards to the optical transceiver 1000 disclosed in FIG. 5A, the following discussion will focus primarily on selected distinctions between the two embodiments.

In the alternative embodiment indicated in FIG. 5B, the laser driver 2002 provides relatively smaller output swings, and a linear amplifier 2003 included as part of the TOSA 2004, in turn, drives the laser 2005. In addition to reducing the drive requirements from the laser driver 2002 implementing the signal preemphasis, this configuration and arrangement allows the signal to be transmitted to the TOSA 2004 on much more convenient higher impedance transmission lines, examples of which include 50 ohm single ended or 100 ohm differential lines. Additionally, such a design may result in lower overall power consumption relative to the single laser driver circuit embodiment.

Directing attention now to FIG. 5C, details are provided concerning yet another embodiment of an optical transceiver, denoted generally at 3000. In this exemplary embodiment, a passive circuit 3002 is included between a laser driver 3004 and the TOSA 3006. The passive circuit 3002 selectively attenuates lower frequencies resulting in a net transmission that increases with frequency and in turn results in a preemphasized optical signal.

This passive signal preemphasis may be combined with aspects of other embodiments, such as those illustrated in FIGS. 5A and 5B, respectively, in various ways. For example, in the case of a laser driver circuit with preemphasis capabilities, the passive circuitry may be used to enhance the total preemphasis and allow the use of a laser driver design with a smaller magnitude of peaking capabilities, designed more to fine tune the final signal.

Yet other arrangements may be employed as well. For example, in implementations where a lower swing laser driver is combined with a linear amplifier in the TOSA, an example of which is indicated in FIG. 5B, the passive circuit may be implemented in between the laser driver and the linear amplifier in order to provide the preemphasis to the emitted optical signals.

As a final example, some embodiments of the invention are configured to include a passive preemphasis circuit between a low swing laser driver with preemphasis capability and a linear amplifier in the TOSA. In this case, the total preemphasis is again partly provided by the laser driver and partly provided by the passive preemphasis circuit.

B. Laser Drivers

The scope of the invention extends to laser drivers or, more generally, drivers, of a variety of different configurations and arrangements. With attention now to FIG. 6, a block diagram of an exemplary laser driver 4000 is indicated. Specifically, a circuit 4000A which subtracts a delayed version of the signal, generated by variable delay 4002, from itself generates positive and negative going pulses at the positive and negative going transitions of the input signal. A similar circuit 4000B, using an XOR function implemented by XOR element 4004, generates pulses of the same polarity for all edges. By scaling and combining these signals, adjustable height peaks at the positive and negative going edges are created. The width of the pulses is determined by the length of the delay used on one copy of the signal before the subtraction or XOR function. Finally, these pulses are scaled and added to the original drive signal, resulting in variable height and width peaks at each data transition.

Figure 6:
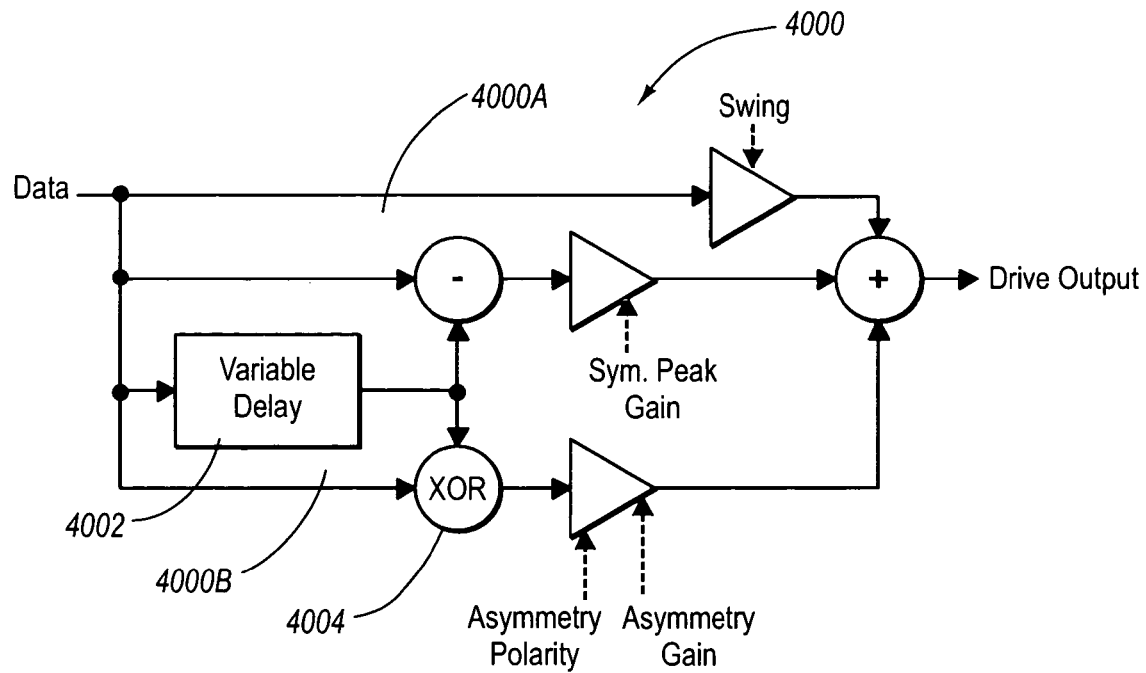
FIG. 6 is a block diagram of an exemplary laser driver such as may be employed in connection with the exemplary devices illustrated in FIGS. 5A and 5B.
Figure 7:
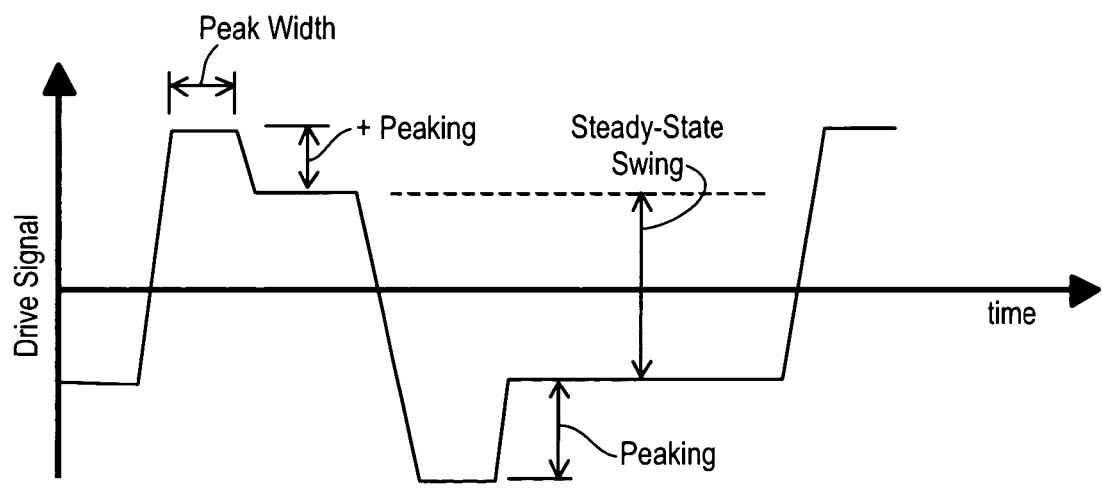
FIG. 7 is a waveform that illustrates exemplary signal parameters susceptible to adjustment by a laser driver such as the exemplary laser driver illustrated in FIG. 6.

As indicated in the exemplary waveform of FIG. 7, laser drivers such as that disclosed in FIG. 6 may be employed to achieve a variety of desirable results. More particularly, FIG. 7 indicates exemplary parameters of the preemphasis drive signal waveform which may be adjusted by such laser drivers. As disclosed in FIG. 7, the various laser driver embodiments provide a flexible mechanism for generating a wide variety of preemphasis drive signals. For example, exemplary embodiments of the laser driver are configured to adjust, alone or in various combinations, parameters of the drive signal including, but not limited to, peak width, −peaking, +peaking, and steady state swing. In one alternative embodiment, the laser driver circuit generates the same types of signals by reducing the amplitude of the longer running parts of the pattern, a technique sometimes referred to as "deemphasis."

It should be noted here that because the lasers used in optical transceivers are not linear devices, a symmetric electrical preemphasis signal, for example, a signal with equal positive and negative peaking, may result in an optical signal with asymmetric peaking. In order to compensate for this, it may be advantageous for the laser driver to provide asymmetric peaking capabilities, whereby the electrical output of the laser driver has different positive going and negative going peaking amplitudes.

As disclosed elsewhere herein, embodiments of the laser driver may be configured to provide a single fixed preemphasis but some implementations allow adjustment of the peaking parameters. Depending upon considerations such as the application and system configuration, these and other parameters can be fixed and/or adjusted at various times.

For example, in one exemplary case, one or more of the drive signal parameters are fixed at design time to provide a desired preemphasis. In an alternative case, one or more of the drive signal parameters are adjusted during factory setup of the optical transceiver in order to achieve a desired fixed preemphasis in the output optical signal. In one specific example, these parameters are adjusted while measuring the calculated TWDP of the output signal in order to optimize that parameter.

Alternatively, the parameters of the preemphasis may be selected and implemented during operation, by the host system, in order to compensate for fibers of known length or impairment. Finally, the parameters of preemphasis may be adjusted during operation by the controller IC based on diagnostic information from the receiver EDC circuit, such as information indicating the nature of the channel impulse response and resulting PIE-D penalty. Thus, optical preemphasis would be selectively used only on channels with impairments that might be near or beyond the limits of the EDC circuits. In such an embodiment, a protocol is employed to make this adjustment during the transceiver startup, or after a receive signal is generated.

III. Sample Experimental Results

Figure 8A:
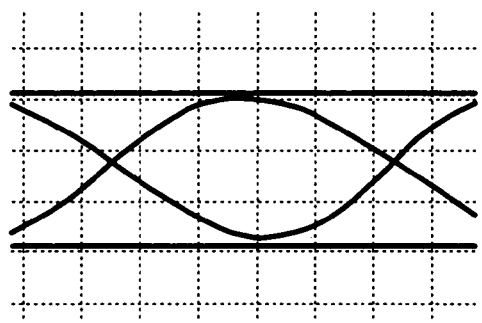
FIG. 8A is an eye diagram of an optical signal with no preemphasis.
Figure 8B:
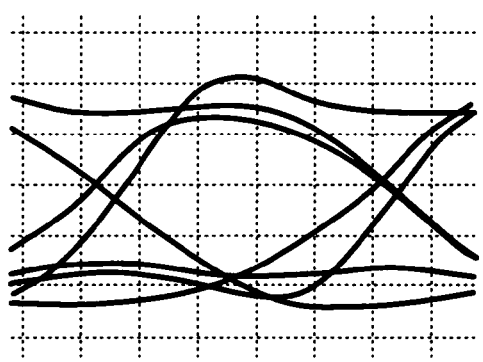
FIG. 8B is an eye diagram of an optical signal with preemphasis.

FIGS. 8A and 8B disclose aspects of an experimental demonstration of exemplary effects of the use of optical preemphasis in EDC based links. In particular, FIGS. 8A and 8B collectively show two measured optical transmit signals generated using an IC that included optical preemphasis circuitry. The electrical output of this IC was amplified and fed into a 10 Gb/s laser transmitter assembly. The case illustrated in FIG. 8A corresponds to a signal with no intentional optical preemphasis (referred to in this example as P0, S0), while the case illustrated in FIG. 8B corresponds to a signal with a predetermined optical preemphasis (referred to in this example as P4, S3).

Figure 8C:
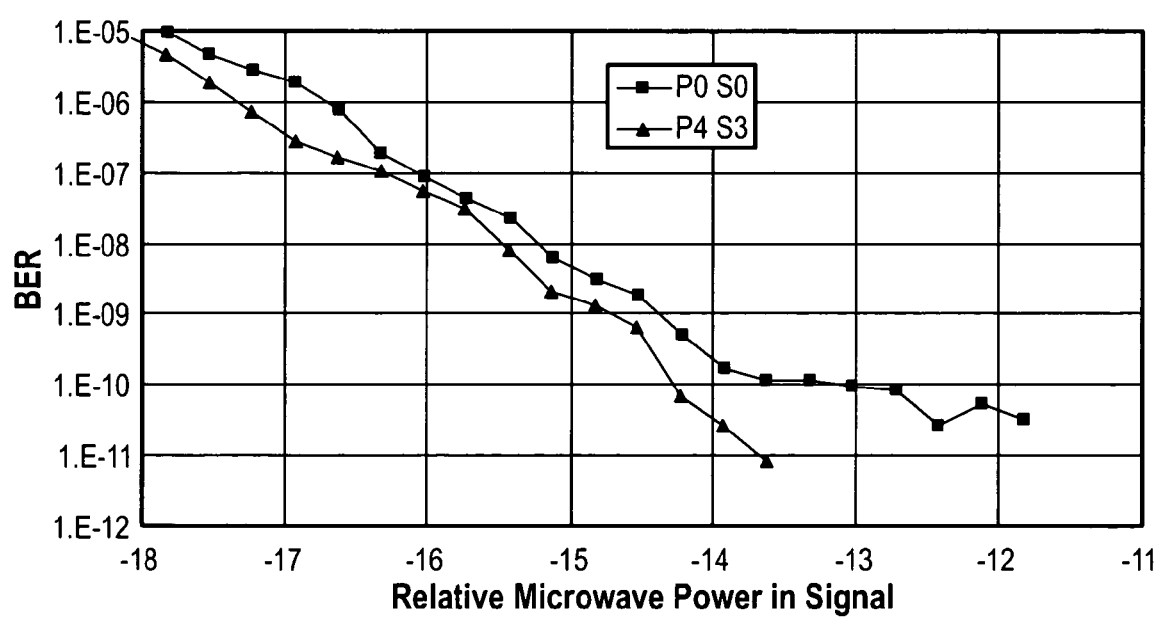
FIG. 8C is a graph that illustrates bit error rate ("BER") as a function of the presence or lack of preemphasis in an optical signal.

In FIG. 8C, the BER of a link through multimode fiber with a complex impulse response is compared as a function of the received optical modulation. There are at least two ways of comparing optical modulation. The first, and more common, method is by comparing the respective optical modulation amplitude ("OMA"), which is the optical power difference between the amplitude of the "0" and "1" levels for long run lengths. This approach may tend to favor the preemphasized signal since that signal, with the same OMA, contains extra energy in the peaked portion of the signal. Another, more conservative, method for comparing optical modulation is to measure the total integrated modulation energy over frequency in each signal, and then correct the relative power curves so points are at equivalent modulation energy. This latter approach to optical modulation comparison is reflected in FIG. 8C.

As is evident even from the relatively conservative equal optical modulation energy comparison approach reflected in FIG. 8C, there is a significant benefit to use of the preemphasized optical signal. In particular, it can be seen from FIG. 8C that the most significant benefit is not seen in the relatively modest improvement at higher BERs (~0.5 dB or less). Rather, the more significant benefit of optical preemphasis is realized at the lower BERs, approaching $10^{-12}$ or less, where the link must function. At these lower BERs, it is clear that the link is performing well with the preemphasized signal, whereas the signal with no optical preemphasis leads both to an error rate floor, between $10^{-10}$ and $10^{-11}$, as well as a rapidly diverging power penalty. That is, FIG. 8C illustrates that the link simply cannot function with the signal that has no optical preemphasis because the total impairment of the link is beyond the capability of the EDC circuit to overcome alone.

The foregoing exemplary experimental results thus clearly demonstrate that a suitable optical preemphasis enables a given EDC optical transceiver to usefully function with links that are incapable of useful operation when used without any optical preemphasis. Thus, implementation of optical preemphasis contributes to extension of the link lengths in connection with which high data rates are employed. In one particular case, optical preemphasis enables achievement of data rates as high as 10 Gb/s over legacy multimode fiber links of at least 300 m in length. Further, the use of optical preemphasis also enables the use of a relatively larger fraction of legacy fibers than would otherwise be possible.

It should be noted here that while exemplary embodiments of the present invention are suited to addressing the problem of 10 Gb/s data transmission on multimode fiber, and on systems where the receiver includes an EDC function, there are other possible applications of this disclosure. For example, the combined implementation of an EDC function and an optical preemphasis function can be usefully employed to improve the reliability and link lengths of 10 Gb/s EML based links.

As another example, optical preemphasis can be employed in links where an EDC function is not implemented in the receiver. In particular, such optical preemphasis can be used to increase the link length in an important subset of multimode fibers where the optical preemphasis will result in an open eye diagram. Similarly, optical preemphasis may be used to overcome a certain degree of chromatic dispersion in single mode fiber links using Fabry-Perot ("FP") lasers, distributed feedback ("DFB") lasers, or EML sources.

IV. Exemplary Methods

Figure 9:
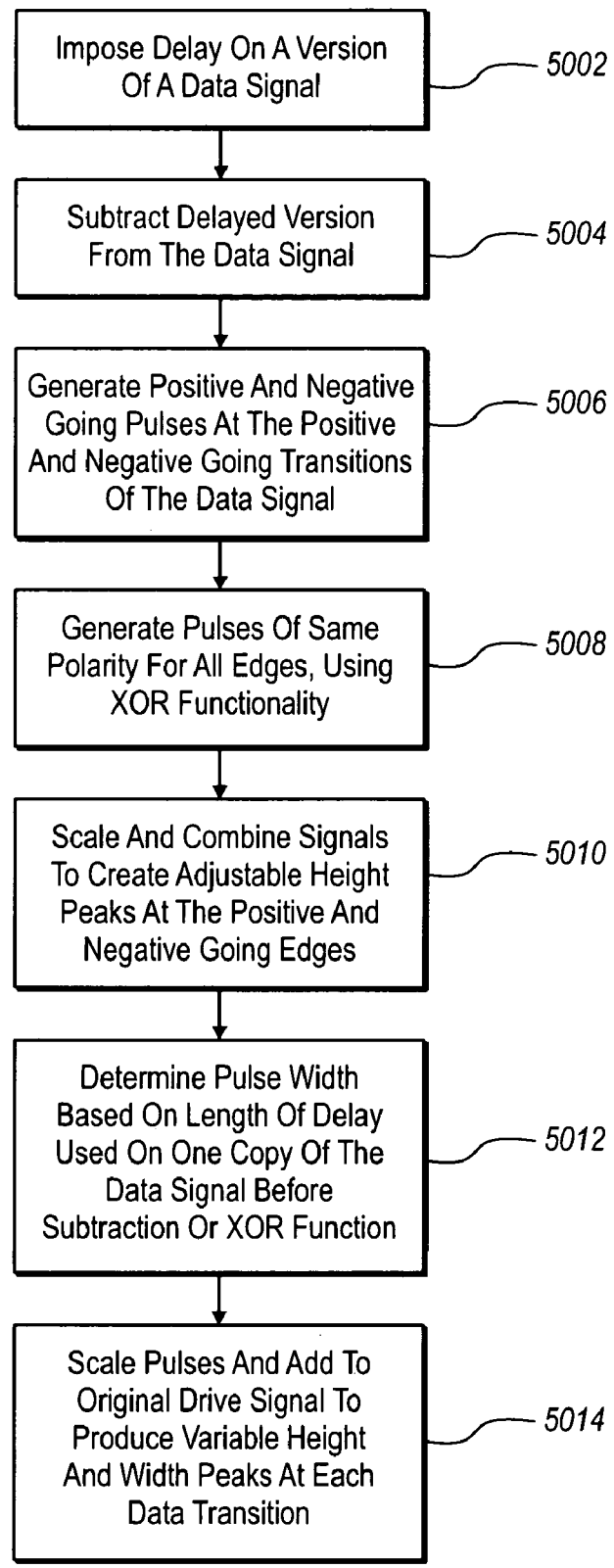
FIG. 9 is a flow chart illustrating aspects of an exemplary method for implementing preemphasis in an optical signal.

Directing attention finally to FIG. 9, details are provided concerning aspects of an exemplary process 5000 for implementing preemphasis in an optical signal. The process 5000 commences at stage 5002 where a delay is imposed on a version of a data signal. At stage 5004, the delayed version of the data signal is subtracted from the data signal, and positive and negative going pulses are generated at the positive and negative going transitions of the input data signal at stage 5006.

An XOR function is implemented at stage 5008 to generate pulses of the same polarity for all edges. Next, adjustable height peaks at the positive and negative going edges are created at stage 5010 by scaling and combining these signals. The width of the pulses is determined at stage 5012 by the length of the delay used on one copy of the signal before the subtraction or XOR function. Finally, at stage 5014 of the process 5000, the pulses are scaled and added to the original drive signal, resulting in variable height and width peaks at each data transition.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transceiver, comprising:
   a receiver optical subassembly that defines at least a portion of a receive path and includes circuitry configured to implement electronic dispersion compensation ("EDC");
   a transmitter optical subassembly that defines at least a portion of a transmit path and includes an optical transmitter;
   preemphasis circuitry configured to facilitate generation of a preemphasized output optical waveform by the optical transmitter; and
   a driver configured for communication with the optical transmitter.

2. The optical transceiver as recited in claim 1, wherein the optical transceiver is compatible for use with multimode fiber.

3. The optical transceiver as recited in claim 1, wherein the optical transceiver is configured to support data rates of at least about 10 Gb/s on multimode fiber links of up to about 300 m in length.

4. The optical transceiver as recited in claim 1, further comprising a controller IC configured to communicate with the receiver and transmitter optical subassemblies, as well as with a host device.

5. The optical transceiver as recited in claim 1, wherein the optical transceiver is substantially compliant with one of the following form factors: XFP; X2; XENPAK; SFP; or, SFF.

6. The optical transceiver as recited in claim 1, wherein at least a portion of the preemphasis circuitry is implemented as part of the driver.

7. The optical transceiver as recited in claim 1, wherein at least a portion of the preemphasis circuitry is implemented in the transmitter optical subassembly.

8. The optical transceiver as recited in claim 1, wherein at least a portion of the preemphasis circuitry takes the form of a passive circuit configured to communicate with the laser driver and the transmitter optical subassembly.

9. The optical transceiver as recited in claim 1, wherein the transmitter optical subassembly includes a linear amplifier configured for communication with the preemphasis circuitry and the driver.

10. The optical transceiver as recited in claim 1, wherein the optical transmitter operates at a wavelength of about 1310 nm.

11. An optical transceiver, comprising:
a receiver optical subassembly that defines at least a portion of a receive path and includes circuitry configured to implement electronic dispersion compensation ("EDC");
a transmitter optical subassembly that defines at least a portion of a transmit path and includes an optical transmitter; and
means for generating a preemphasized optical output waveform.

12. The optical transceiver as recited in claim 11, wherein the means for generating a preemphasized optical output waveform generates a preemphasized drive signal by combining a main data signal with a peaking signal, where the peaking signal comprises a difference between the main signal and a delayed version of the main signal.

13. The optical transceiver as recited in claim 11, wherein the means for generating a preemphasized optical output generates a preemphasized signal by reducing, in a drive signal, amplitude of longer run length pattern segments relative to short transition segments.

14. The optical transceiver as recited in claim 11, wherein the means for generating a preemphasized optical output modifies at least one of the following drive signal parameters: peak width; −peaking; +peaking; and, steady state swing.

15. The optical transceiver as recited in claim 11, wherein the means for generating a preemphasized optical output waveform causes asymmetric peaking in the optical output waveform by:

combining a main data signal and a delayed version of the main data signal to form a resulting signal; and
combining the resulting signal with the main data signal and the symmetric peaking signal.

16. The optical transceiver as recited in claim 11, further comprising a controller IC configured to communicate with the receiver and transmitter optical subassemblies, as well as with a host device.

17. The optical transceiver as recited in claim 11, further comprising circuitry located in the receive path and configured to implement electronic dispersion compensation ("EDC").

18. The optical transceiver as recited in claim 11, wherein the optical transceiver is substantially compliant with one of the following form factors: XFP; X2; XENPAK; SFP; or, SFF.

19. The optical transceiver as recited in claim 11, wherein the optical transceiver is compatible for use with multimode fiber.

20. An optical transceiver, comprising:
a receiver optical subassembly that defines at least a portion of a receive path;
a transmitter optical subassembly that defines at least a portion of a transmit path and includes an optical transmitter;
preemphasis circuitry configured to facilitate generation of a preemphasized output optical waveform by the optical transmitter; and
a driver configured for communication with the optical transmitter.

* * * * *

UNITED STATES PATENT AND TRADEMARK OFFICE
CERTIFICATE OF CORRECTION

PATENT NO. : 7,147,387 B2
APPLICATION NO. : 11/038757
DATED : December 12, 2006
INVENTOR(S) : Aronson et al.

It is certified that error appears in the above-identified patent and that said Letters Patent is hereby corrected as shown below:

Column 11
Line 66, remove [5000]
Line 67, remove [5000]

Column 12
Line 14, remove [5000]

Signed and Sealed this

Thirtieth Day of November, 2010

David J. Kappos
*Director of the United States Patent and Trademark Office*